United States Patent [19]

Corle et al.

[11] Patent Number: 5,386,317
[45] Date of Patent: Jan. 31, 1995

[54] METHOD AND APPARATUS FOR IMAGING DENSE LINEWIDTH FEATURES USING AN OPTICAL MICROSCOPE

[75] Inventors: Timothy R. Corle, Palo Alto; Younus Vora, San Jose; Kamran Sarmadi, Milpitas, all of Calif.

[73] Assignee: Prometrix Corporation, Santa Clara, Calif.

[21] Appl. No.: 882,499

[22] Filed: May 13, 1992

[51] Int. Cl.6 .................. G02B 21/06; G02B 27/00
[52] U.S. Cl. ........................ 359/386; 359/368; 359/900
[58] Field of Search .................. 359/368–371, 359/385–386, 484, 489, 500, 900; 356/41, 364–366

[56] References Cited

U.S. PATENT DOCUMENTS

| | | | |
|---|---|---|---|
| 3,785,714 | 1/1974 | Hock et al. | 359/386 |
| 4,255,014 | 3/1981 | Ellis | 359/371 |
| 4,389,084 | 6/1983 | Ban et al. | 359/386 |
| 4,634,240 | 1/1987 | Suzuki et al. | 359/386 |
| 4,927,254 | 5/1990 | Kino et al. | 359/368 |
| 5,022,743 | 6/1991 | Kino et al. | 359/368 |
| 5,067,805 | 11/1991 | Corle et al. | 359/235 |

FOREIGN PATENT DOCUMENTS 1083065 10/1961 Germany .

OTHER PUBLICATIONS

Collett, "Polarized Light–Fundamentals and Applications," pp. 187–198, Marcel Dekker, Inc., New York (1993).

Analysis of a Strip–Grating Twist Reflector, Naqvi, et al., J. Opt. Soc. Am. A, vol. 7, No. 9, pp. 1723–1729 (Sep. 1990).

Confocal Scanning Optical Microscopy, G. S. Kino, et al., Physics Today, 42, pp. 55–62 (Sep. 1989).

Primary Examiner—Loha Ben
Assistant Examiner—Thong Nguyen

[57] ABSTRACT

A method and apparatus for imaging a substrate (such as silicon or silicon dioxide) beneath and between a dense array of strips (such as photoresist strips composed of dielectric or other material) using a polarizing optical microscope. In preferred embodiments, the apparatus of the invention includes a polarizer for polarizing optical illuminating radiation, an analyzer for receiving polarized radiation reflected from the sample, and a variable retarder whose retardation characteristic can be controlled to enhance the light signal transmitted through the analyzer from the substrate in a region of interest of the sample. The variable retarder can be a fixedly mounted retarder whose birefringence is variable in response to a control signal, or a rotatably mounted retarder plate having fixed birefringence which is mechanically rotatable to control the orientation of its optical axis. In one embodiment, the retarder is a quarter wave plate, the projection on the sample of the polarization axis of linearly polarized radiation from the polarizer forms an angle of about 45 degrees to the sample's strips, and the optical axis of the quarter wave plate is oriented at an optimal angle to the strips, so that the quarter wave plate converts the linearly polarized illuminating radiation into elliptically polarized radiation, the elliptically polarized radiation undergoes a polarization change upon reflection from the sample, and the quarter wave plate converts the reflected elliptically polarized radiation from the sample into radiation whose polarization is oriented so that it can be transmitted by the analyzer.

26 Claims, 4 Drawing Sheets

METHOD AND APPARATUS FOR IMAGING DENSE LINEWIDTH FEATURES USING AN OPTICAL MICROSCOPE

FIELD OF THE INVENTION

The invention pertains to a polarizing optical microscope, and to a method for operating such microscope to image a substrate beneath and between a dense array of strips. In an embodiment, the invention pertains to a polarizing optical microscope of the confocal scanning type, and to a method for operating such microscope to image a substrate beneath and between a dense array of strips.

BACKGROUND OF THE INVENTION

In a variety of commercially significant operations, it would be desirable to employ an optical microscope to image a substrate beneath and between a dense array of strips (such as strips having width less than 0.7 microns). For example, during the microlithographic step of semiconductor product manufacturing, it is desirable to measure the width of one or more photoresist lines in an array of photoresist lines deposited on a substrate. Typically, such structures are "1:1 dense arrays" of lines on the substrate (i.e., structures in which the spacing between adjacent lines deposited on the substrate is substantially equal to the width of each line). Measurements taken on a dense array of photoresist lines track the microlithographic process more accurately than measurements of the widths of isolated lines.

If the lines in a dense array (such as a 1:1 dense array) have width less than about 0.7 microns, conventional optical microscopes receive little or no deflected light from the substrate in the spaces between the lines. Making accurate linewidth measurements once the light signal from trenches between the lines has disappeared is an extremely difficult task. For this reason, until the present invention, semiconductor manufacturers have effectively been forced to use scanning electron microscopes to measure linewidths in dense arrays below 0.7 microns.

An advantage of the invention is that it provides a convenient and economical way to modify an optical microscope, to enable that microscope to image dense linewidth features in accordance with the invention. One type of optical microscope that can be modified in accordance with the invention is known as a confocal scanning optical microscope (CSOM). A primary advantage of a CSOM, which images samples one point at a time through an array of pinholes, is that it has a shallower depth of field than most other optical microscopes. Thus, a CSOM is able to resolve both height and width information, and to image (independently) areas of a sample which are separated in height by a wavelength with reduced interference.

Examples of CSOMs are described in Kino et al. U.S. Pat. No. 4,927,254, issued May 22, 1990, Kino et al. U.S. Pat. No. 5,022,743, issued Jun. 11, 1991, and in the paper by G. S. Kino and T. R. Corle, entitled "Confocal Scanning Optical Microscopy," Physics Today, 42, pp. 55–62 (September 1989).

The latter paper describes a CSOM in which light from an arc lamp propagates through a spinning Nipkow disk (a perforated disk through which a large number of holes have been drilled or etched in a spiral pattern). Each illuminated hole of the Nipkow disk produces a spot on the sample to be imaged. Light reflected from the sample propagates back through the disk to an eyepiece or camera. Many points on the sample are simultaneously illuminated by light through the holes of the Nipkow disk, so that the system effectively functions as a large number of confocal microscopes in parallel. The sample is scanned as the disk spins and the spinning spiral hole pattern sweeps the illuminated point pattern across the sample. As the disk spins, the system generates a real-time confocal scanning image of the sample.

SUMMARY OF THE INVENTION

The invention is a method and apparatus for imaging a substrate beneath (and between) a dense array of strips using a polarizing optical microscope. The strips can be composed of dielectric material or some other material (for example, polysilicon). The invention is useful for imaging dense arrays of photoresist lines on common substrates used in the semiconductor industry (such as silicon, polysilicon, silicon nitride, BPSG, silicon dioxide, and aluminum), as well as other dense arrays of strips on other types of substrates.

In a class of preferred embodiments, the optical microscope of the invention includes a polarizer (for polarizing the optical illuminating radiation), an analyzer (through which polarized radiation reflected from the sample propagates), and a rotatably mounted retardation plate (for example, a quarter-wave plate) which has been rotated into an optimal orientation for enhancing (or maximizing) the light signal transmitted through the analyzer from the substrate in the region of interest of a sample (where the sample includes a dense array of strips on the substrate).

In a preferred embodiment, the retarder is a quarter wave plate positioned near the sample (between the polarizer and the sample), and the projection on the sample of the polarization axis of the linearly polarized radiation from the polarizer forms an angle of substantially 45 degrees to the sample's major linear features. The optical (fast or slow) axis of the quarter wave plate is oriented at an optimal angle (typically about 25 degrees) with respect to the major linear features of the sample, in which orientation the quarter wave plate converts the linearly polarized illuminating radiation into elliptically polarized radiation, the elliptically polarized radiation undergoes polarization rotation upon reflection from the sample, and the quarter wave plate then converts the reflected elliptically polarized radiation from the sample into radiation whose polarization is oriented so that it can be transmitted by the analyzer.

If the retarder plate of the inventive microscope is optimally oriented, and the microscope employs illuminating radiation of sufficiently short wavelength and optics having suitably selected focal lengths, the microscope is capable of imaging a substrate beneath and between a dense array of very narrow strips (each strip having a width of 0.7 microns or less).

The apparatus of the invention may also be employed to image a sample comprising one (or more than one) strip deposited on a substrate. To image a sample having just one strip deposited on a substrate, a retardation characteristic of the variable retarder of the apparatus should be controlled to enhance transmission, through the retarder, of radiation reflected from a region of the substrate immediately adjacent to the strip.

The inventive method for imaging a substrate beneath and between a dense array of dielectric strips (for example, photoresist strips), includes the steps of receiving, at an analyzer, polarized illuminating radiation that has transmitted through or reflected from the sample, and rotating a retardation plate (for example, a quarter-wave plate) mounted in the path of the illuminating radiation into an optimal orientation for enhancing the signal from the substrate (i.e., an orientation for maximizing the light signal transmitted through the analyzer from the region of interest of the sample's substrate).

DETAILED DESCRIPTION OF THE PREFERRED EMBODIMENT

Figure 1:
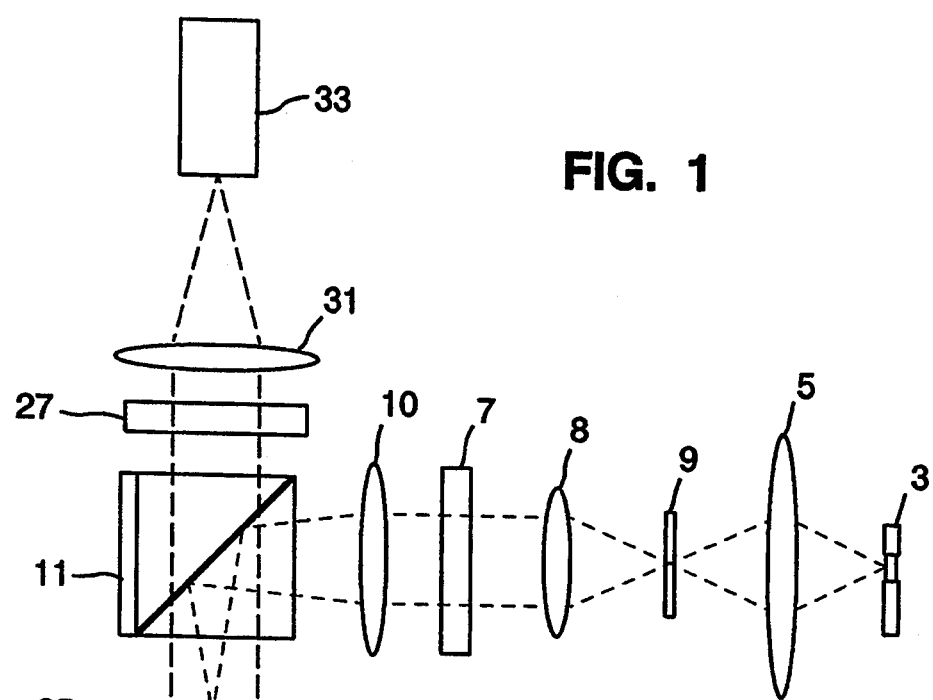
FIG. 1 is a simplified side view of a first embodiment of the inventive real-time confocal scanning microscope.

FIG. 1 is a real-time confocal scanning microscope having a retarder plate rotatably mounted in accordance with the invention. The optical microscope of FIG. 1 includes motor 13, for spinning Nipkow disk 1 about its axis 2. Light from source 3 (which may be an arc lamp or other intense source) is focused by condensor 5, propagates through aperture 9 and collimating lens 8, is then polarized by polarizer 7, focused by lens 10 onto beamsplitting cube 11, and is reflected by beamsplitting cube 11 toward disk 1. Some of the light impinging on disk 1 propagates through holes in disk 1, and then through field lens 26 and tube lens 15, retarder plate 17 (which is a quarter wave plate), and objective lens 19 onto sample 21.

The outer rim of retarder plate 17 (or a means to which plate 17 is mounted) is engaged with gear 14. Stepper motor 12 rotates gear 14 to rotate retarder plate 17 with respect to axis 22. Axis 22 is substantially normal to the surface of sample 21, and is the common optical axis of lens 15, lens 19, and plate 17. In variations on the FIG. 1 embodiment (to be described below), plate 17 is mounted in a tilted orientation with its optical axis at a nonzero tilt angle to the sample's normal axis 22.

Some of the illuminating radiation reflects from sample 21, and then propagates back through lens 19, plate 17, lenses 15 and 26, the same set of holes in disk 1, and then through lens 25. A portion of the reflected light from lens 25 is then transmitted through beamsplitting cube 11, analyzer 27, and lens 31. Polarized light transmitted through analyzer 27 and lens 31 is incident at image recording device 33 (which can be a camera such as a CCD camera). Alternatively, an eyepiece may replace the image recording device.

Polarizer 7, quarter wave plate 17, and analyzer 27 together function to reduce interference from unwanted reflections from disk 1. Analyzer 27 is oriented to block radiation reflected from the top of disk 1 which has not propagated twice through quarter wave plate 17.

Figure 2:
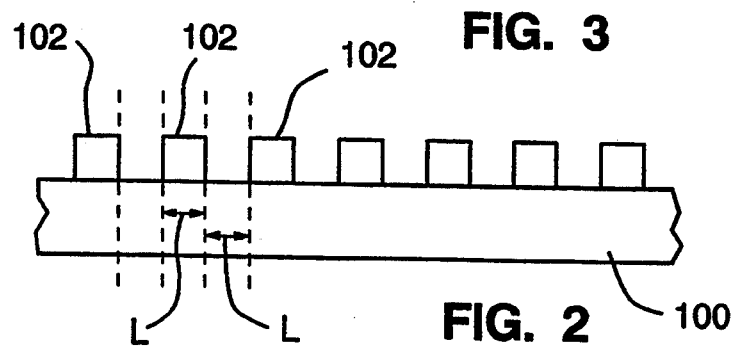
FIG. 2 is a side cross-sectional view of a sample having a 1:1 dense array of line features deposited on a substrate, of the type which can imaged in accordance with the invention.

FIG. 2 is an enlarged, side cross-sectional view of a portion of sample 21 of FIG. 1. As indicated in FIG. 2, the sample comprises a 1:1 dense array of strips 102 deposited on substrate 100. Each strip 102 has a width substantially equal to L, and the width of each trench between adjacent strips 102 is also substantially equal to distance L. Strips 102 can be composed of dielectric material or some other material (for example, polysilicon). In a class of embodiments, strips 102 are photoresist lines deposited on a substrate 100. Substrate 100 is typically a thin film of polysilicon, silicon nitride, BPSG, silicon dioxide, or other substrate material, deposited on silicon, gallium arsenide, or other substrate material.

Figure 3:
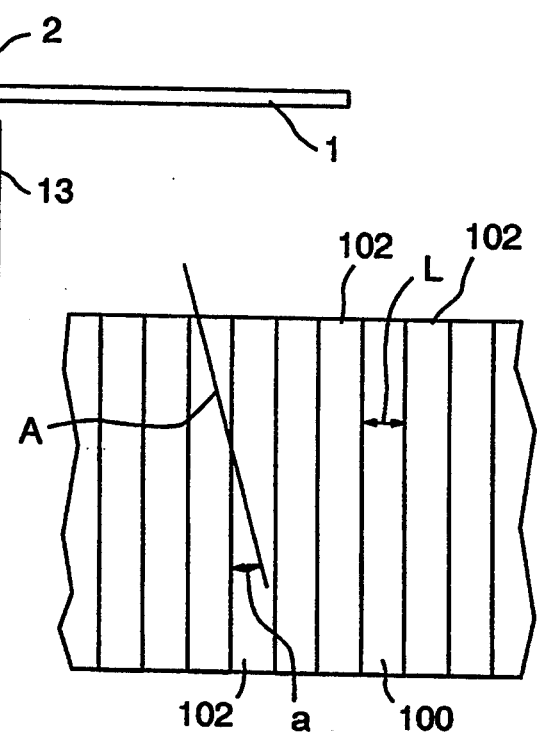
FIG. 3 is a plan view of a portion of the sample of FIG. 2, showing the preferred orientation of the optical axis of the retarder plate in a class of preferred embodiments of the invention.

FIG. 3 is a plan view of a portion of the sample of FIG. 2. In accordance with the invention, and as shown in FIG. 3, retarder plate 17 is rotated until the projection "A" of its optical axis on the sample is oriented at a nonzero angle "a" with respect to the longitudinal axes of strips 102. Optical axis "A" of plate 17 can be either the fast axis or the slow axis thereof.

With reference again to FIG. 1, in a preferred embodiment, polarizer 7 is oriented so that (with plate 17 removed from the system) linearly polarized radiation is projected from polarizer 7 onto sample 21 with its polarization axis oriented at an angle substantially equal to 45 degrees to the sample's major linear features (strips 102), and quarter wave plate 17 is oriented so that the projection "A" (shown in FIG. 3) of the optical axis thereof on the sample is at an experimentally determined optimal angle "a" (shown in FIG. 3) to the sample's major linear features (strips 102). The optimal angle "a" is the angle (in the range from zero to 90 degrees) which maximizes the light signal transmitted through analyzer 27 from substrate 100 in the region of interest of sample 21. The optimum angle "a" will depend on the width L of strips 102 of the sample, and the type of material which comprises strips 102 and substrate 100, but will typically be about 25 degrees.

In its optimal orientation, quarter wave plate 17 converts the linearly polarized radiation from polarizer 7 into elliptically polarized radiation, the elliptically polarized radiation undergoes polarization rotation upon reflection from sample 21, and quarter wave plate 17 converts the reflected elliptically polarized radiation from sample 21 into polarized radiation which can be transmitted by analyzer 27.

It should be appreciated that if quarter wave plate 17 were oriented with its optical axis substantially 45 degrees to the polarization direction of the incoming linearly polarized illuminating radiation, then the quarter wave plate would convert the linearly polarized radiation to circularly polarized radiation. In prior art polarizing optical microscopes, it had been assumed that the sample would reflect incident circularly polarized radiation back to the quarter wave plate with circular polarization, and that such reflected circularly polarized radiation would be reconverted to purely linearly polarized radiation after propagating through the quarter wave plate. However, it has now been recognized that samples having dense arrays of line features deposited on a substrate will generally alter the polarization of incident circularly polarized radiation upon reflection, thereby causing the reflected radiation to have elliptical rather than circular polarization. For this reason, quarter wave plate 17 of the inventive apparatus will generally be oriented with its optical axis at an optimal angle other than 45 degrees to the polarization direction of the incoming linearly polarized illuminating radiation, when imaging samples having dense arrays of line features deposited on a substrate.

Figure 4:
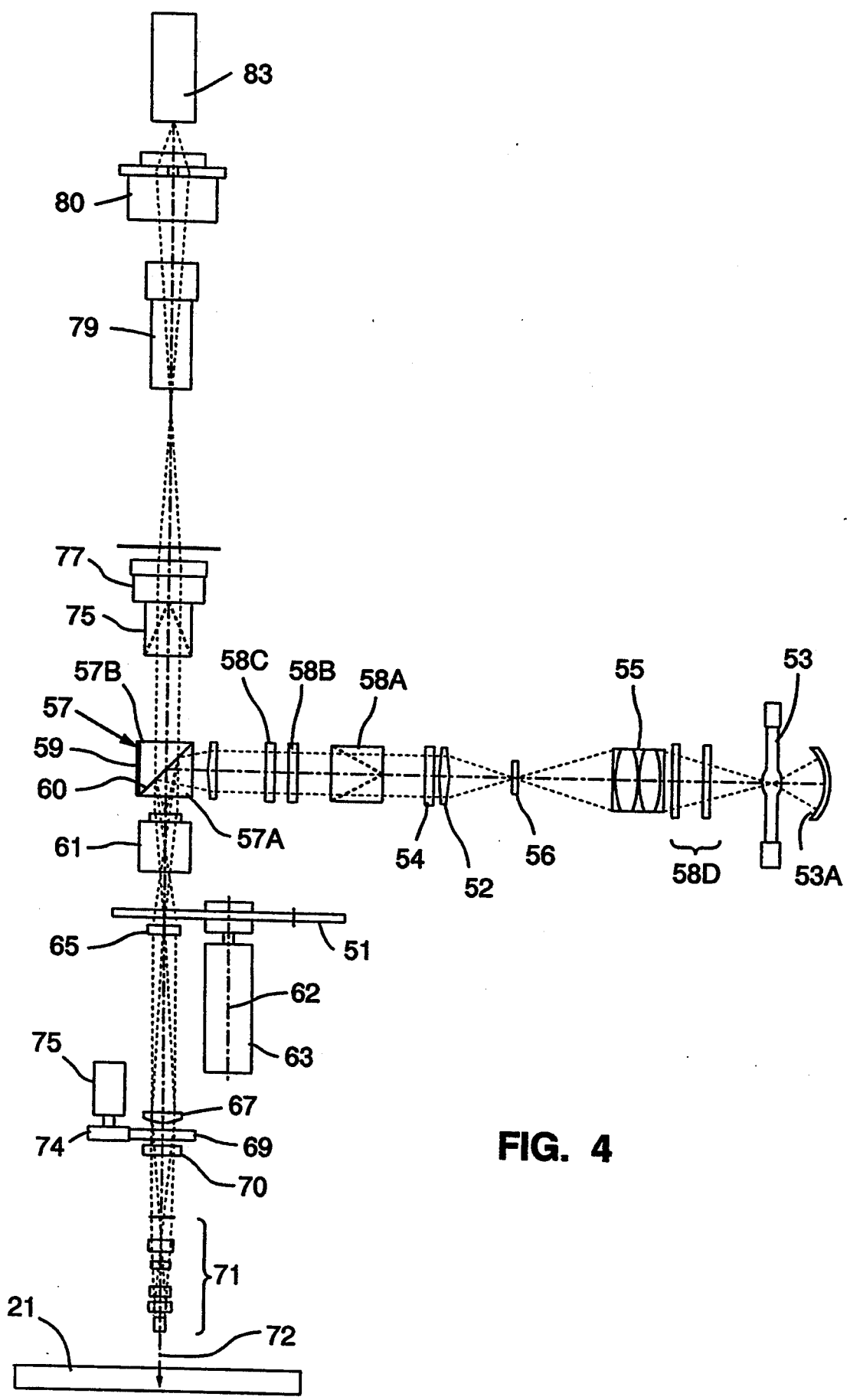
FIG. 4 is a simplified side view of a second embodiment of the inventive real-time confocal scanning microscope.

In the FIG. 4 embodiment, the inventive microscope includes motor 63 for spinning Nipkow disk 51 about disk axis 62. Light from source 53 (including light from source 53 which has reflected from mirror 53A) propagates through filters 58D, is then focused by condensor 55 on a pinhole aperture through apertured plate 56, and then propagates through lens 52, iris diaphragm 54, pre-polarizing cube 58A, neutral density filters 58B, and color filters 58C, to a front face of polarizing beamsplitting cube 57. Source 53 may be an arc lamp or another intense source.

In the embodiment of FIG. 4, cube 57 comprises triangular prisms 57A and 57B, dielectric film interface 60 sandwiched between prisms 57A and 57B, and an absorbing layer 59. Layer 59 is preferably a sheet of black glass optically cemented on the back face of element 57B.

Some of the illuminating radiation from cube 57 passes through secondary objective lens 61 to disk 51, propagates through holes in disk 51, and then through field lens 65, tube lens 67, retarder plate 69, compensating plate 70, and objective lens 71, onto sample 21. Preferably, retarder plate 69 is a quarter wave plate, although it can be an eighth wave plate or some other retarder plate in alternative embodiments of the invention. After reflecting from sample 21, light propagates back through lens 71, elements 69 and 70, lens 67, lens 65, the same set of holes in disk 51, and lens 61. After having its polarization rotated by twice propagating through element 69, this light is incident at cube 57, and a portion of the incident light propagates through film 60 and exits cube 57 through a face of element 57B.

After exiting cube 57, the polarized radiation from sample 21 propagates through analyzer cube 75, lens 77, magnification control elements 79, and camera relay lenses 80, to video camera 83. In alternative embodiments of the invention, an eyepiece may be used as a means for receiving the image (in place of camera 83, or in addition to camera 83).

U.S. Pat. No. 5,067,085, issued Nov. 26, 1991, describes a preferred implementation of an apparatus similar to the FIG. 4 apparatus (but which lacks rotatably mounted retarder plate 69, motor 75, and gear 74), including a preferred orientation for cube 57 in the apparatus.

Pre-polarizer 58A, cube 57, analyzer 75, and retarder element 69 function together to reduce interference from unwanted reflections from disk 51, in the following manner. Cube 57 is oriented to block radiation that has exited the side face of element 57A and reflected back to that side face from disk 51. Thus, cube 57 functions to polarize the prepolarized radiation from element 58A for illuminating sample 21, and also functions as an analyzer which selectively transmits light reflected from sample 21.

Analyzer cube 75, which receives radiation transmitted through cube 57, also selectively transmits light reflected from sample 21. Both beamsplitting cube 57 and analyzer cube 75 are positioned in the collimated beam path portion between secondary objective lens 61 and tube lens 77.

The position of beamsplitting cube 57 in the collimated beam path portion between secondary objective lens 61 and tube lens 77 substantially reduces the chromatic aberrations that are present in embodiments in which the beamsplitting cube is positioned between the Nipkow disk and both the secondary objective and secondary tube lens.

The outer rim of retarder plate 69 is engaged with gear 74. Stepper motor 75 rotates gear 74 to rotate retarder plate 69 with respect to the common optical axis 72 of lens 71, and lens 67.

In the FIG. 4 embodiment, elements 58A and 57 are preferably oriented so that (with plate 69 removed from the system) linearly polarized radiation is projected from cube 57 onto sample 21 with its polarization axis oriented at an angle of substantially 45 degrees to the sample's major linear features (strips 102). Also preferably, plate 69 is a quarter wave plate oriented so that the projection "A" (shown in FIG. 3) of the optical axis thereof on sample 21 is at an experimentally determined optimal angle "a" (also shown in FIG. 3) to the sample's major linear features (strips 102). Such optimal angle "a" is the angle (in the range from zero to 90 degrees) which maximizes the light signal transmitted through cube 57 from the region of interest of sample 21's substrate 100. Just as in the FIG. 1 embodiment, the optimum angle "a" will depend on the width L of strips 102 of the sample and the substrate material, but will typically be about 25 degrees.

In its optimal orientation, quarter wave plate 69 of the embodiment described in the previous paragraph converts the linearly polarized illuminating radiation from cube 57 into elliptically polarized radiation, the elliptically polarized radiation undergoes polarization rotation upon reflection from sample 21, and quarter wave plate 69 converts the reflected elliptically polarized radiation from sample 21 into radiation whose polarization most closely matches that of linearly polarized radiation capable of propagating from plate 69 through both cubes 57 and 75.

If the retarder plate of the inventive microscope is optimally oriented, and the microscope employs illuminating radiation of sufficiently short wavelength and optics having suitably selected focal lengths, the microscope is capable of imaging a substrate beneath and between a dense array of very narrow strips (each strip having a width of 0.7 microns or less).

Figure 5:
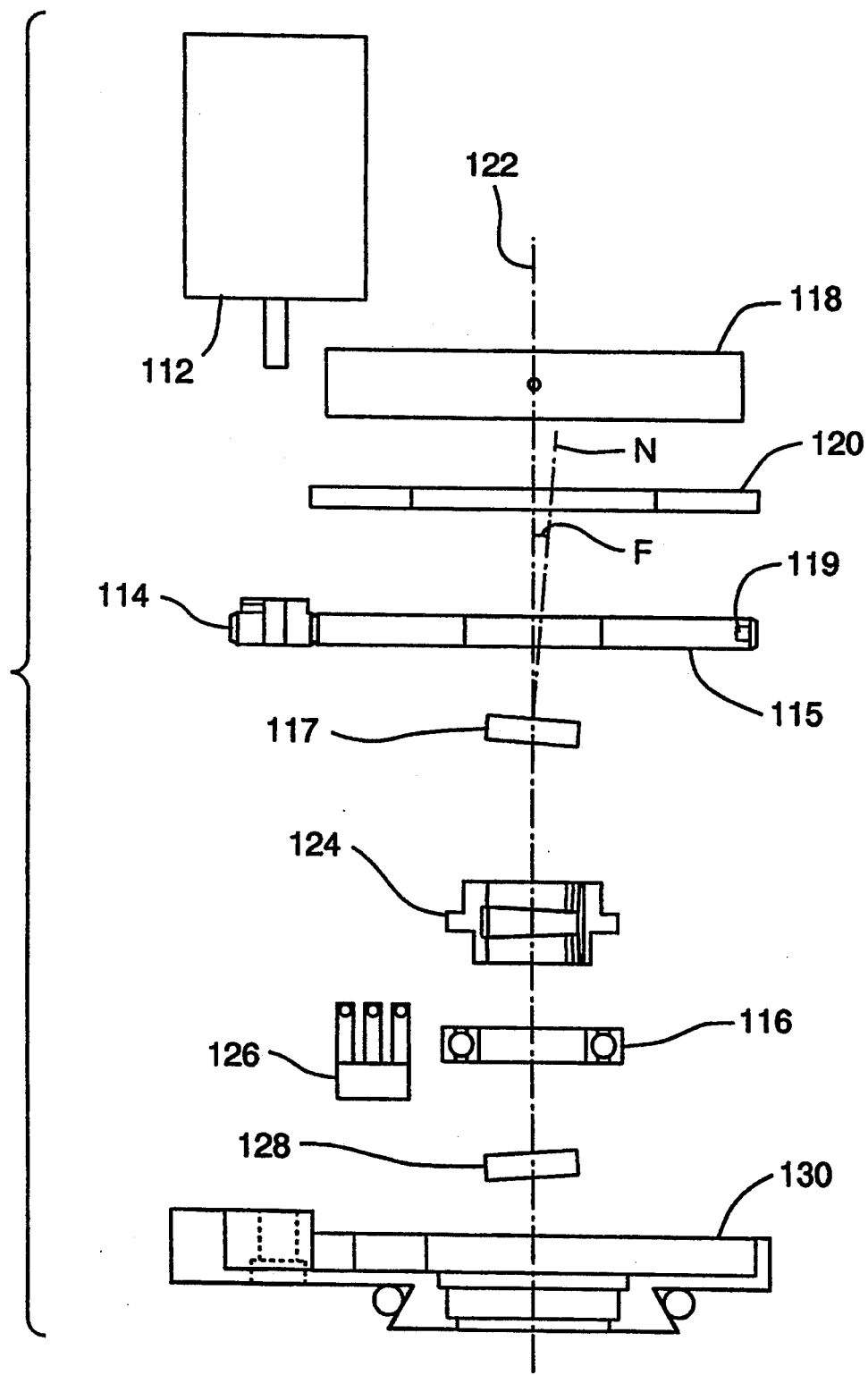
FIG. 5 is an exploded, cross-sectional view of a rotatably mounted retarder plate assembly employed in a preferred embodiment of the invention.

FIG. 5 is an exploded, cross-sectional view of a rotatably mounted retarder plate assembly employed in a preferred embodiment of the inventive microscope. FIG. 5 shows retarder plate 117, and a means for rotatably mounting retarder plate 117. Plate 117 is mounted with its normal axis N tilted at an angle F with respect to axis 122, in order to prevent stray reflections from the top and bottom surfaces of plate 117 from interfering with radiation which propagates through plate 117, reflects from the sample, and again propagates through plate 117. Angle F is equal to about three degrees in a preferred embodiment of the invention.

With plate 117 mounted in a tilted orientation (i.e., when plate 117 is mounted with a nonzero tilt angle F as shown in FIG. 5), the beam transmitted through plate 117 will precess as gear 115 and plate 117 rotate as a unit about axis 122. This precession effect can be eliminated by providing a second transmissive plate 128 which is mounted at a compensating tilt angle.

In FIG. 5, plate 128 is mounted at a tilt angle equal in magnitude but opposite in sign to the tilt angle of plate 117. Plates 117 and 128 are fixedly mounted in mount 124. Mount 124 is in turn fixedly mounted in the central orifice of ring-shaped gear 115, so that the central longitudinal axis of mount 124 coincides with gear 115's central longitudinal axis. Plate 128 can be (but need not be) made of material having the same thickness and index of refraction as quarter wave plate 117. If plate 128 has a different thickness or refractive index than plate 117, then plate 128's thickness, refractive index, and position should be selected so that each of plate 117 and window 128 will return a beam passing through the FIG. 5 assembly to the assembly's optical axis (vertical axis 122 in FIG. 5) after the beam has been deviated away from the optical axis as a result of transmission through the other of plate 117 and window 128.

In the FIG. 5 assembly, metal cover plate 120 can be fixedly attached to the top surface of support member 130, so that assembled plate 120 and member 130 enclose assembled elements 115, 124, 117, 128, and 116.

Mount 118 is attached to the top surface of plate 120. A lens housing can be mounted within mount 118, and a lens (such as lens 15 of FIG. 1 or lens 67 of FIG. 4) can be mounted within the lens housing.

The outer rim of gear 115 (which is preferably made of nylon) defines a set of teeth which mesh with teeth of gear 114 (which is preferably made of brass). When stepper motor 112 drives gear 114, rotating gear 114 in turn causes the assembly comprising elements 115, 119, and 124, plates 117 and 128, and bearing 116 to rotate as a unit (about vertical axis 122 in FIG. 5) relative to support member 130. The outer race of ball bearing member 116 rests on member 130, and the inner race of member 116 is free to roll with low friction relative to support member 130, so that the entire assembly comprising elements 115, 116, 117, 119, 124 and 128 can rotate with low friction relative to member 130.

Hall detector unit 126 is fixedly mounted to member 130 in a position for detecting the proximity of magnet 119 (fixedly mounted to the rotating assembly) as the assembly rotates past unit 126. The output of Hall detector unit 126 can be processed in a microprocessor (not shown) to identify an initial rotational position of gear 115 (and hence retarder plate 117). Upon initialization of the system, stepper motor 112 can be activated to rotate gear 115 until the output of Hall detector unit 126 indicates that gear 115 is in the initial position. In variations on the FIG. 5 apparatus, other types of sensors can be employed to identify the rotational position of gear 115 (and hence retarder plate 117).

Following initialization of the system, the driver for stepper motor 112 generates an output signal indicative of the number of steps by which motor 112 has rotated gear 115 (from gear 115's initial position). This output signal can be converted into a digital data stream in interface circuitry (not shown) and the digital data then processed in a microprocessor (not shown) to determine the current rotational position of gear 115 (and hence retarder plate 117).

Figure 6:
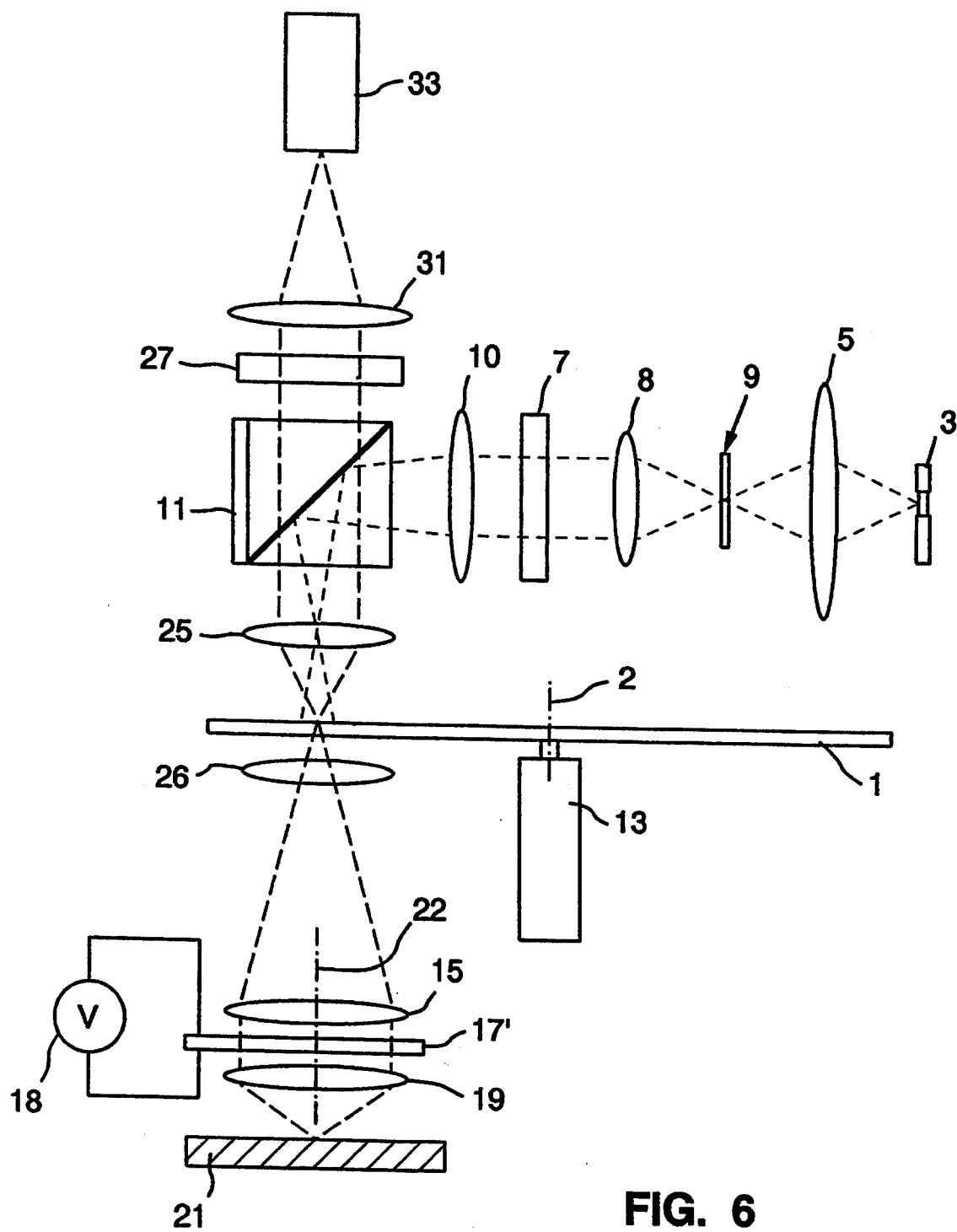
FIG. 6 is a simplified side view of a third embodiment of the inventive real-time confocal scanning microscope.

Alternative embodiments of the invention employ a fixedly mounted, variable retarder plate (whose birefringence varies in response to an externally generated control signal), rather than a rotatably mounted retarder plate whose optical axis orientation can be varied by mechanical rotation. FIG. 6 is a real-time confocal scanning microscope which includes such a fixedly mounted, variable retarder plate 17'. The FIG. 6 apparatus is identical to the FIG. 1 apparatus, except that rotatably mounted retarder plate 17, motor 12, and gear 14 in FIG. 1 are replaced (in FIG. 6) by fixedly mounted, variable retarder plate 17' and voltage source 18 for supplying driving voltage signals to plate 17'.

In the following description and in the claims, the expression "variable retarder" denotes both a fixedly mounted, variable retarder (whose birefringence varies in response to an externally generated control signal), and a rotatably mounted retarder plate having fixed birefringence (whose optical axis orientation can be varied by mechanical rotation). Also in the following description and the claims, the expression "retardation characteristic" denotes a characteristic of a retarder (such as fast or slow optical axis orientation, or birefringence) which determines the polarization of a beam transmitted through the retarder. The polarization of the transmitted beam can be changed either by varying the retarder's birefringence (if the retarder is a variable retarder such as a Pockel's cell or liquid crystal retarder), or the orientation of the retarder's optical axes.

In FIG. 6, variable retarder 17' can be a liquid crystal variable retarder (such as Part No. LVR-0.7-STD, available from Meadowlark Optics, Longmont, Colo.), a Pockel's cell, or another electro-optic waveplate selected from those commercially available. In embodiments in which variable retarder 17' is an electro-optic waveplate, the desired polarization of the radiation transmitted through retarder 17' can be attained by adjusting the voltage applied across variable retarder 17' by voltage source 18.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A polarizing optical microscope for imaging a sample including a dense array of strips on a substrate, said microscope including:
   a variable retarder positioned near the sample, said variable retarder having a retardation characteristic;
   a means for directing a polarized illuminating beam to the variable retarder, wherein the variable retarder is positioned to transmit a portion of the illuminating beam to the sample and to transmit a reflected beam from the sample, wherein the reflected beam comprises radiation from the illuminating beam that has been reflected from the sample;
   an analyzer positioned to receive the reflected beam and transmit a portion of said reflected beam; and
   means for controlling the retardation characteristic to cause the variable retarder to transmit said portion of the illuminating beam with an elliptical polarization, and to cause the reflected beam to have a second polarization for enhancing transmission through the analyzer of a component of said reflected beam comprising radiation reflected from the substrate.

2. The microscope of claim 1, wherein the polarized illuminating beam is linearly polarized when incident at the variable retarder.

3. The microscope of claim 2, wherein the variable retarder is a quarter wave plate mounted with freedom to rotate relative to the sample, the means for directing a polarized illuminating beam to the variable retarder, and the analyzer.

4. The microscope of claim 1, wherein the variable retarder is a fixedly mounted retarder having birefringence which is variable in response to variation of an externally generated control signal.

5. The microscope of claim 4, also including a means for applying the control signal to the variable retarder.

6. The microscope of claim 1, wherein the variable retarder is a retarder plate, and also including:
  rotatable mounting means for mounting the retarder plate with freedom to rotate relative to the sample about a rotation axis.

7. The microscope of claim 6, also including:
  means for rotating the rotatably mounted retarder plate, thereby orienting an optical axis of the retarder plate in a desired direction in a plane normal to the rotation axis.

8. The microscope of claim 7, wherein the means for rotating the rotatably mounted retarder plate includes:
  a motor; and
  gear means connected between the motor and the rotatable mounting means.

9. A polarizing optical microscope for imaging a sample including at least one strip on a substrate, said microscope including:
  a variable retarder positioned near the sample, wherein the variable retarder is a retarder plate;
  a means for directing a polarized illuminating beam to the variable retarder, wherein the variable retarder is positioned to transmit a portion of the illuminating beam to the sample and to transmit a reflected beam from the sample, wherein the reflected beam comprises radiation from the illuminating beam that has been reflected from the sample;
  an analyzer positioned to receive the reflected beam and transmit a portion of said reflected beam; and
  rotatable mounting means for mounting the retarder plate with freedom to rotate relative to the sample about a rotation axis, wherein the sample has a surface having a normal axis, wherein the rotation axis is substantially parallel to the normal axis, and wherein the rotatable mounting means includes:
    a means for mounting the retarder plate with the rotation axis at a nonzero tilt angle to the normal axis;
    a transmissive plate; and
    a means for mounting the transmissive plate at a compensating tilt angle, wherein the nonzero tilt angle and the compensating tilt angle have opposite signs.

10. The microscope of claim 9, wherein the means for rotatably mounting the retarder plate also includes:
  a sensor means for generating a signal indicative of rotational orientation of the retarder plate about the rotation axis.

11. A real-time confocal scanning microscope for imaging a sample including at least one strip on a substrate, said microscope including:
  a rotatably mounted disk, perforated with an array of holes;
  a variable retarder positioned between the rotatably mounted disk and the sample, the variable retarder having a retardation characteristic;
  beamsplitting means for directing a polarized illuminating beam to the variable retarder, wherein the variable retarder is positioned to transmit a portion of the illuminating beam to the sample and to receive a reflected beam from the sample, wherein the reflected beam comprises radiation from the illuminating beam which has been reflected from the sample, and wherein the beamsplitting means transmits an imaging portion of said reflected beam;
  an image receiving means positioned to receive the imaging portion of the reflected beam from the beamsplitting means;
  an analyzer positioned between the beamsplitting means and the image receiving means for receiving the reflected beam and transmitting said imaging portion of the reflected beam to the image receiving means; and
  means for controlling the retardation characteristic of the variable retarder to cause the variable retarder to transmit said portion of the illuminating beam with an elliptical polarization, and to cause the reflected beam to have a second polarization for enhancing transmission through the analyzer of a component of the reflected beam comprising radiation reflected from the substrate of the sample.

12. The microscope of claim 11, wherein the sample includes a dense array of strips on the substrate, and wherein said component of the reflected beam comprises radiation reflected from the substrate beneath and between the dense array of strips.

13. The microscope of claim 11, wherein the variable retarder is a fixedly mounted retarder having birefringence which varies in response to an externally generated control signal.

14. The microscope of claim 13, also including a means for applying the control signal to the variable retarder.

15. The microscope of claim 11, wherein the variable retarder is a retarder plate, and also including:
  rotatable mounting means for mounting the retarder plate with freedom to rotate relative to the sample about a rotation axis.

16. The microscope of claim 15, also including means for rotating the rotatably mounted retarder plate, thereby orienting an optical axis of the retarder plate in a desired direction in a plane normal to the rotation axis.

17. The microscope of claim 16, wherein the means for rotating the rotatably mounted retarder plate includes:
  a motor; and
  gear means connected between the motor and the rotatable mounting means.

18. The microscope of claim 11, wherein the variable retarder is a quarter wave plate mounted with freedom to rotate relative to the sample and the beamsplitting means.

19. A real-time confocal scanning microscope for imaging a sample including at least one strip on a substrate, said microscope including:
  a rotatably mounted disk, perforated with an array of holes;
  a variable retarder positioned between the rotatably mounted disk and the sample, wherein the variable retarder is a retarder plate;
  beamsplitting means for directing a polarized illuminating beam to the variable retarder, wherein the variable retarder is positioned to transmit a portion of the illuminating beam to the sample and to receive a reflected beam from the sample, wherein the reflected beam comprises radiation from the illuminating beam which has been reflected from the sample, and wherein the beamsplitting means transmits an imaging portion of said reflected beam; and rotatable mounting means for mounting the retarder plate with freedom to rotate relative to the sample about a rotation axis, wherein the sample has a surface having a normal axis, wherein the rotation axis is substantially parallel to the normal axis, and wherein the means for rotatably mounting the retarder plate includes:

a means for mounting the retarder plate with the rotation axis at a nonzero tilt angle to the normal axis;

a transmissive plate; and a means for mounting the transmissive plate at a compensating tilt angle, wherein the nonzero tilt angle and the compensating tilt angle have opposite signs.

20. A method for imaging a sample having a dense array of strips on a substrate, including the steps of:
(a) imaging the sample using a polarizing optical microscope, wherein the polarizing optical microscope includes a variable retarder; and
(b) varying a retardation characteristic of the variable retarder to direct an elliptically polarized illuminating beam from the variable retarder to the sample for use in performing step (a).

21. The method of claim 20, wherein step (a) includes the steps of:
generating a linearly polarized illuminating beam; and
directing the linearly polarized illuminating beam at the variable retarder, wherein said linearly polarized illuminating beam is converted to an elliptically polarized illuminating beam as a result of propagating through the variable retarder.

22. The method of claim 21, wherein the variable retarder is a quarter wave plate.

23. The method of claim 20, wherein the variable retarder is a fixedly mounted retarder having a variable birefringence, and wherein step (b) includes the step of applying a control signal to the fixedly mounted retarder to vary the birefringence of said fixedly mounted retarder.

24. The method of claim 20, wherein the variable retarder is a rotatably mounted retarder plate, and wherein step (b) includes the step of rotating the retarder plate relative to the sample about a rotation axis.

25. The method of claim 24, wherein step (b) includes the step of rotating the retarder plate to orient an optical axis of the retarder plate in a desired direction in a plane normal to the rotation axis.

26. A method for imaging a sample having a dense array of strips on a substrate, including the steps of:
(a) imaging the sample using a polarizing optical microscope, wherein the polarizing optical microscope includes a variable retarder; and
(b) varying a retardation characteristic of the variable retarder to direct an elliptically polarized illuminating beam from the variable retarder to the sample for use in performing step (a), wherein the polarizing optical microscope includes an analyzer, wherein step (a) includes the step of:

transmitting radiation from the sample through the analyzer, said radiation having propagated once through the variable retarder, reflected from the sample, and propagated a second time through the variable retarder before reaching the analyzer, and wherein step (b) includes the step of:

varying the retardation characteristic of the variable retarder to direct an optimally elliptically polarized illuminating beam to the sample, said optimally elliptically polarized illuminating beam resulting in enhanced transmission through the analyzer of radiation reflected from the substrate in a region of interest of the sample.

* * * * *